(12) United States Patent
Graham

(10) Patent No.: US 6,520,344 B2
(45) Date of Patent: Feb. 18, 2003

(54) DEVICE FOR PROTECTING AND SUPPORTING VEHICLE TIRES

(76) Inventor: James Ralph Graham, 2033 SW. 24th Ave., Norman, OK (US) 73072

(*) Notice: Subject to any disclaimer, the term of this patent is extended or adjusted under 35 U.S.C. 154(b) by 0 days.

(21) Appl. No.: 09/792,926

(22) Filed: Feb. 26, 2001

(65) Prior Publication Data

US 2001/0050260 A1 Dec. 13, 2001

Related U.S. Application Data

(60) Provisional application No. 60/184,756, filed on Feb. 24, 2000.

(51) Int. Cl.[7] .................................................. A47F 7/00
(52) U.S. Cl. ........................................... 211/20; 254/88
(58) Field of Search ............................... 211/20, 22–24; 248/346.01, 351; 206/304; 254/88; 152/208, 246, 213 R, DIG. 19; 81/15.8

(56) References Cited

U.S. PATENT DOCUMENTS

| | | | | |
|---|---|---|---|---|
| 446,835 A | * | 2/1891 | Kennedy | 211/20 |
| 653,048 A | * | 7/1900 | Wigg | 211/20 |
| 718,244 A | * | 1/1903 | Comburn | 211/20 |
| 731,651 A | * | 6/1903 | Allen | 211/20 |
| 1,047,048 A | * | 12/1912 | Harrison | 211/20 |
| 1,131,477 A | * | 3/1915 | Crofoot | 211/20 |
| 1,428,223 A | * | 9/1922 | Fairbanks | 211/20 |
| 1,717,560 A | * | 6/1929 | Henle | 211/20 |
| 1,901,475 A | * | 3/1933 | Shank | 211/20 |
| 3,510,007 A | * | 5/1970 | Walklet et al. | 211/20 |
| 3,785,517 A | * | 1/1974 | Brajkovich | 211/17 |
| 3,937,263 A | * | 2/1976 | Hill et al. | 152/213 R |
| 4,487,314 A | * | 12/1984 | Stewart | 152/213 R |
| 4,550,835 A | * | 11/1985 | Lynch | 211/24 |
| 4,819,910 A | * | 4/1989 | Johnston | 254/88 |
| 4,834,128 A | * | 5/1989 | Burgess | |
| 4,911,343 A | * | 3/1990 | Lords et al. | |
| 5,011,347 A | * | 4/1991 | Bullock | |
| 5,036,986 A | * | 8/1991 | Kral | 211/22 |
| 5,078,277 A | * | 1/1992 | Tschritter | 211/20 |
| 5,279,346 A | * | 1/1994 | Summey | 152/213 R |
| 5,400,846 A | * | 3/1995 | Bowman | 152/213 R |
| 5,462,211 A | * | 10/1995 | Eversoll | 206/304 X |
| 5,562,215 A | * | 10/1996 | Blakey et al. | 211/17 |
| 5,626,241 A | * | 5/1997 | Holden | 211/24 |
| 5,702,007 A | * | 12/1997 | Fritz et al. | 211/17 |
| 5,749,475 A | * | 5/1998 | Krebs | 211/24 |
| D416,843 S | * | 11/1999 | Brown | 206/304 X |
| 6,135,420 A | * | 10/2000 | Johnston et al. | 254/88 |
| 6,148,887 A | * | 11/2000 | Ahne | 152/213 R |
| 6,190,290 B1 | * | 2/2001 | Mackert | |
| D444,286 S | * | 6/2001 | Ahne | 152/213 R |

* cited by examiner

Primary Examiner—Daniel P. Stodola
Assistant Examiner—Jennifer E. Novosad
(74) Attorney, Agent, or Firm—Sand & Sebolt

(57) ABSTRACT

A vehicle tire support has a body formed with a front ramp surface adapted to permit the tire to roll up onto the body, and a top surface for supporting the tire having an arcuate configuration adapted for supporting the tire. The top surface includes a pair of spaced apart peaks and a trough position between the peaks for supporting the vehicle tire. Additionally, support blocks may be provided beneath the body for raising the body to ensure that the vehicle, when supported, remains level. Still further, the body provides grooves extending through the top surface to permit drainage and air flow around the vehicle tire.

14 Claims, 11 Drawing Sheets

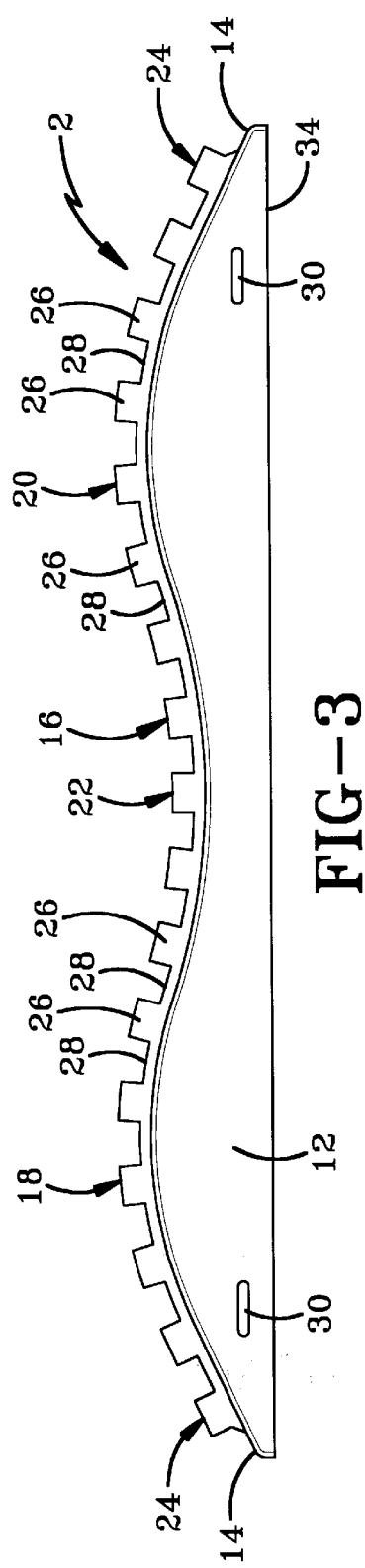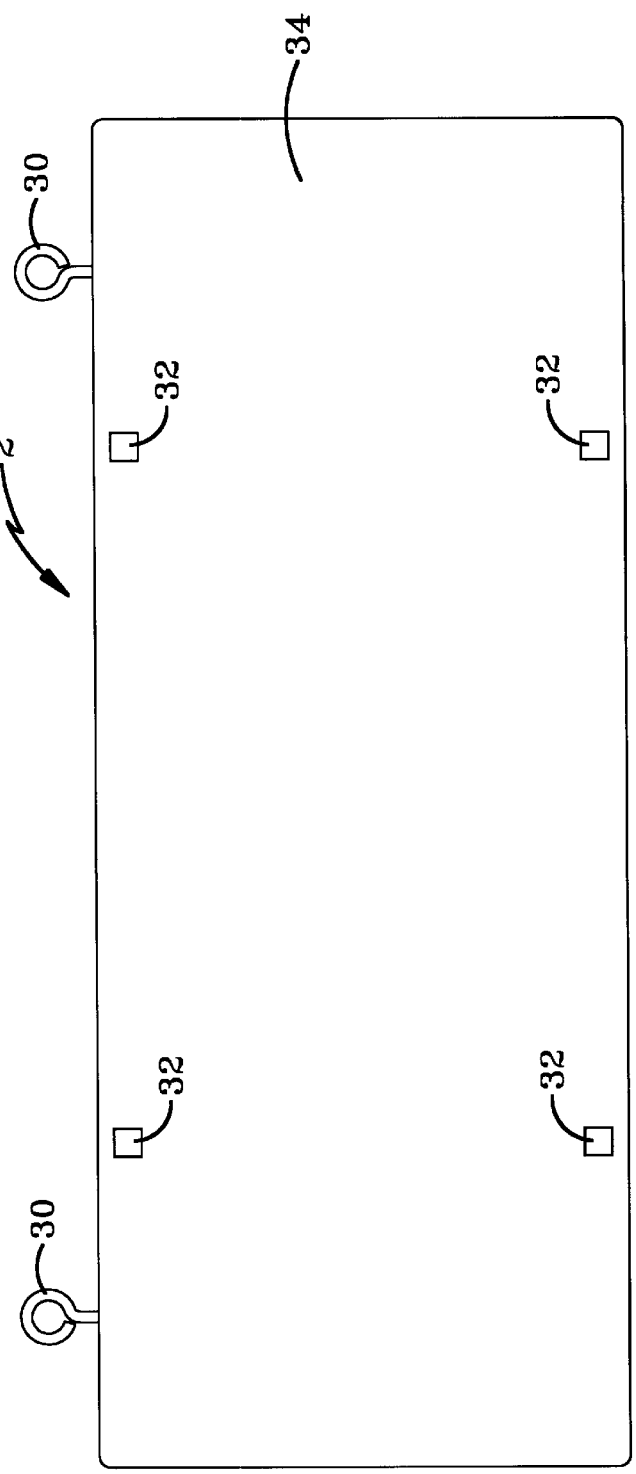

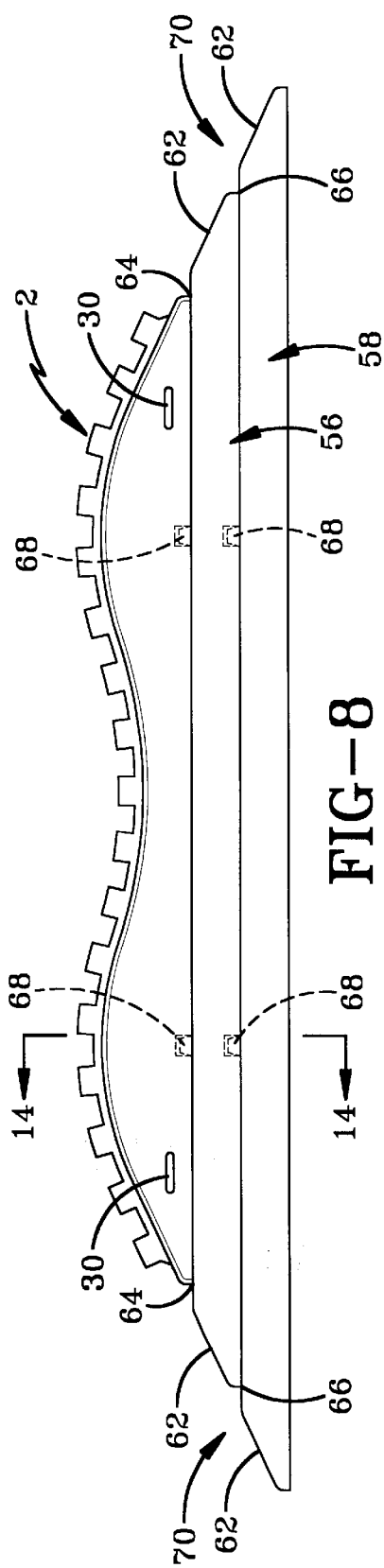
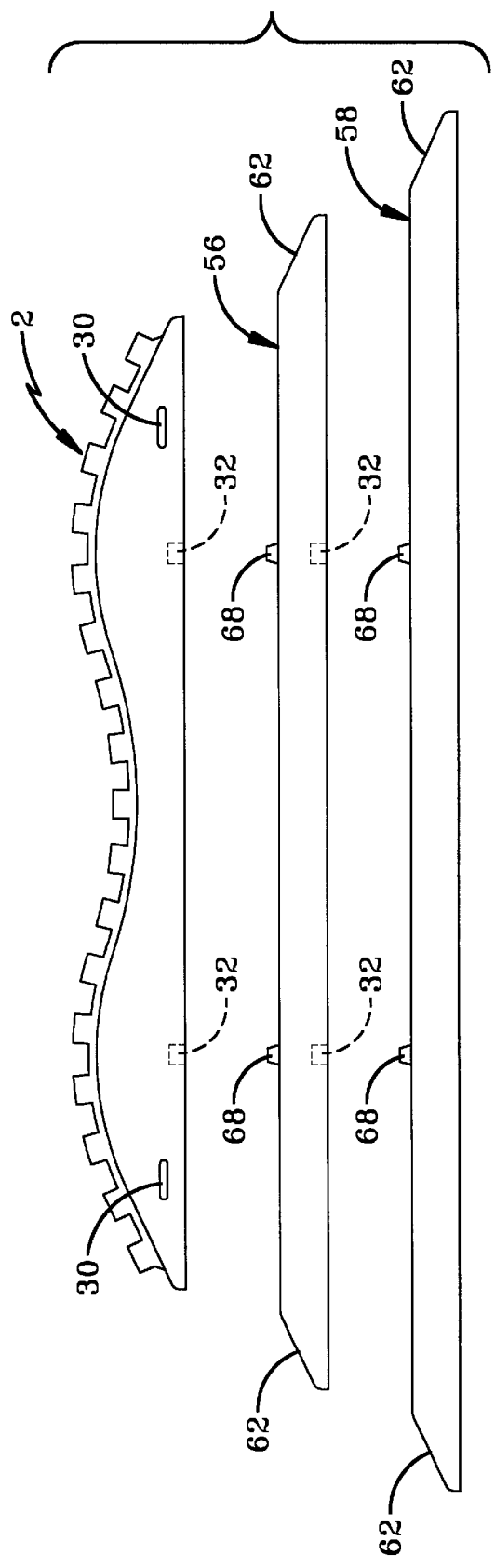

DEVICE FOR PROTECTING AND SUPPORTING VEHICLE TIRES

CROSS REFERENCE TO RELATED APPLICATION

This application is based on U.S. provisional application Ser. No. 60/184,756 filed on Feb. 24, 2000, the disclosures of which are incorporated herein by reference.

BACKGROUND OF THE INVENTION

1. Technical Field

The present invention relates generally to support for wheeled vehicles. More particularly, the invention relates to a tire support to be positioned below each tire of a vehicle or trailer. Specifically, the invention relates to a device for supporting and protecting a tire when a vehicle is in storage for extended periods.

2. Background Information

Custom automobiles and classic automobiles have become increasingly popular in recent years. This popularity is increasing as modern automobiles become increasingly complicated and the home mechanics who are interested in working on automobiles are forced to move to classic automobiles in an attempt to promote this hobby. Additionally, the use of travel trailers is ever increasing. As people continue to increase their travel throughout the United States, and the number of retired persons also increases, the use of travel trailers to be pulled behind automobiles, sport utility vehicles and pickup trucks is also increasing. While the use of travel trailers and classic and custom automobiles is increasing, users of these automobiles and trailers tend to only use them occasionally. As a result, these automobiles and trailers tend to sit for extended periods of time without use.

The sporadic use of these types of automobiles and trailers creates a number of unique problems including, for example, that the piping system in travel trailers must be filled with antifreeze to assure that the pipes do not freeze when the trailer is sitting in an unheated area over colder months in certain portions of the United States. Additionally, automobile and trailer tires may experience a number of other problems associated with sporadic use. More particularly, tires on automobiles and trailers may dry rot after exposure to the sun, may have a flat spot formed on the bottom surface of the tire where it contacts the ground after an extended period of time with the vehicle weight being supported on this portion of the tire, and the constant contact of a tire with the ground may cause rotting as a result of the constant dampness migrating from the ground to the tire rubber. Additionally, the undercarriage of the automobile or trailer may be subject to rust and corrosion as a result of its close proximity to the ground and, as such, there is some value in raising the vehicle above the ground to increase the distance between the undercarriage of the vehicle and the ground, and to also increase the air flow between the ground and the vehicle undercarriage so as to reduce the likelihood of corrosion and rust. Still further, and more particularly directed to travel trailers, when trailers are parked for an extended period of time, for example at a campground, the tires will also suffer many of the same issues associated with rot and tire flattening but, have the additional problem that the area around the trailer may be uneven. As such, it becomes important to have a blocking mechanism to support the tires so as to level the trailer during use.

The prior art provides a number of solutions to the above referenced problems including placing jack stands and jacks underneath the vehicle axles to raise the tires entirely off the ground and preventing contact between the tire and the ground so as to prevent rotting and flattening of the tire. While this method of preventing damage to the tire is presumably adequate for the purpose for which it is intended, it can be somewhat time consuming and dangerous. Additionally, it is difficult to remove the jacks and jack stands from under the vehicle each time an owner may wish to use the vehicle and, as such, the number of times which the vehicle is used during a given year may be reduced.

Still further, it is known to cover tires with a flexible membrane such as a tarp to prevent the sun's ultraviolet rays from damaging the tire sidewalls. Again, while the use of these flexible membranes is presumably adequate for the purpose for which it is intended, the membrane themselves are difficult to install and have no way of being securely attached to the ground and, as such, are often displaced from a position adjacent the tire by wind and rain.

Still further, it is known to block the tires on wooden planks and stones to raise the vehicle off the ground thereby reducing the likelihood of corrosion and rust associated with the close proximity of the earth to the vehicle undercarriage. Again, while these devices are presumably adequate for the purpose for which they are intended, they can be difficult to position below a tire, and can be somewhat dangerous during removal. Blocking of this type also does not prevent tire flattening as the flattening of the tire is a result of extended time periods where the vehicle weight is supported on the tire at a given position.

Still further, such blocking is utilized to level travel trailers such as occurs in campgrounds and the like. Again, such leveling can be somewhat dangerous, and does not prevent a number of the problems associated with tire damage when the trailer is supported over long periods of time in such a manner.

While the prior art described above is presumably adequate for the purpose for which it is intended, it does not provide a number of the elements of the present invention, and most notably the need exists for a tire support which supports the vehicle weight over a larger portion of the tire diameter, which provides air flow between the tire and the support, and which may be used to securely retain a flexible membrane around the tire to prevent damage from ultraviolet rays. Still further, the need exists for a tire support which may be utilized with tandem axle vehicles, and which allows trailers and vehicles to be leveled when parked for extended periods of time.

SUMMARY OF THE INVENTION

Objectives of the invention include providing an improved tire support which provides air flow around the entire circumference of the tire.

A further objective of the invention includes providing a tire support which supports the vehicle tire around a larger portion of the circumference of the tire than would otherwise be supported if sitting on flat ground.

A still further objective of the invention is to provide a tire support which flexibly contacts the tire.

A still further objective of the invention is to provide a tire support which provides easy connection to a tire cover.

Yet another objective of the invention is to provide a tire support, the height of which may be variably adjusted.

A still further objective of the invention is to provide such a tire support which is of a simple construction, which achieves the stated objectives in a simple, effective and inexpensive manner, and which solves problems and satisfies needs existing in the art.

These and other objectives and advantages of the invention are obtained by the improved tire support, the general nature of which is described in more detail hereinbelow.

BRIEF DESCRIPTION OF THE DRAWINGS

Preferred embodiments of the invention, illustrative of the best mode in which the applicant has contemplated applying the principles, are set forth in the following description and are shown in the drawings and are particularly and distinctly pointed out and set forth the appended claims.

FIG. 3 is a side elevational view of the tire support shown in FIG. 2;

FIG. 4 is a bottom view of the tire support shown in FIG. 2;

FIG. 8 is a front side elevational view of the tire support and tire support risers shown in FIG. 7

FIG. 9 is an exploded perspective view of the tire support and tire support rods as shown FIG. 8;

Similar numerals refer to similar parts throughout the drawings.

DESCRIPTION OF THE PREFERRED EMBODIMENT

Figure 1:
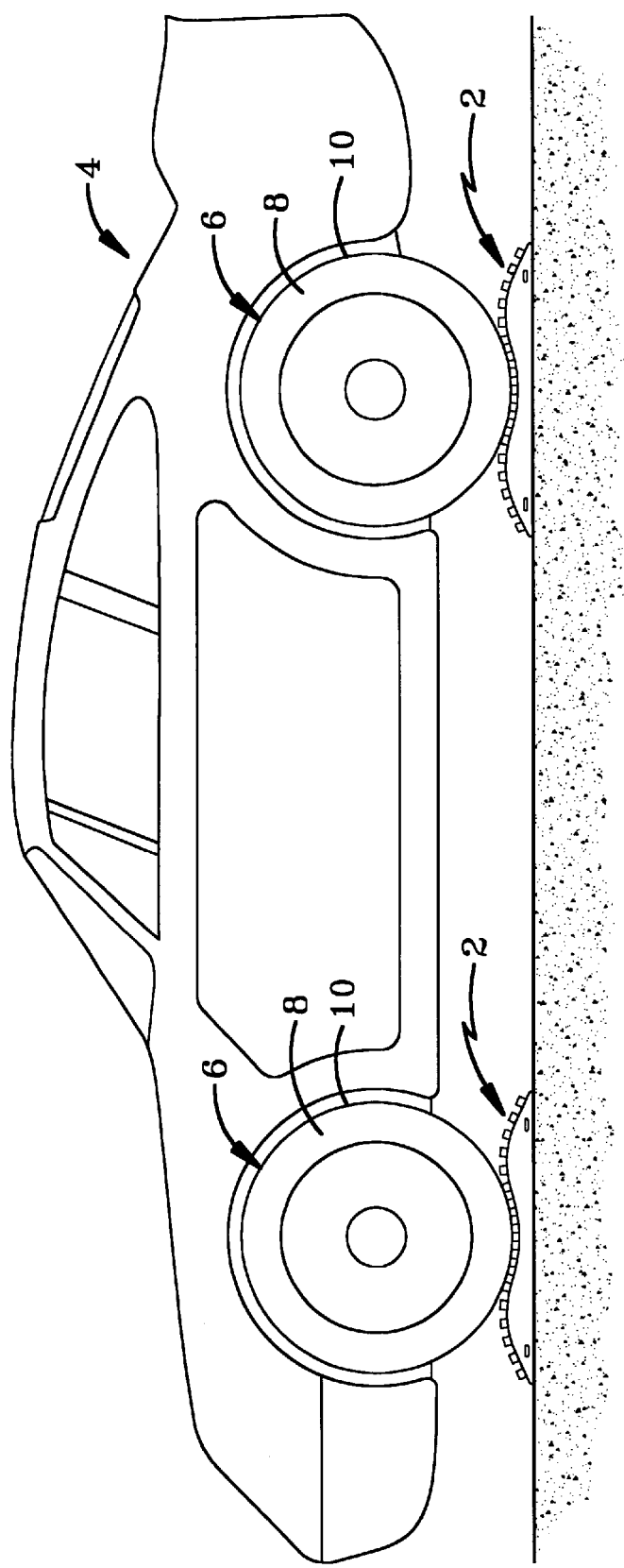
FIG. 1 is an elevational view of a pair of tire supports of the present invention shown supporting a vehicle.

A tire support according to the present invention is designated generally at 2, and is shown particularly in FIGS. 1–4. Tire support 2 is shown in FIG. 1 supporting a vehicle 4 having a plurality of tires 6. Each tire 6 is substantially circular in design and includes a sidewall 8 and a tread area 10 which extends circumferentially around each tire 6. Tire support 2 more particularly includes a pair of parallel and spaced apart sidewalls 12, a pair of spaced apart end walls 14 extending between sidewalls 12 and substantially perpendicular thereto. Additionally, tire support 2 includes a top surface 16 for supporting tread area 10 of tire 6. In the preferred embodiment, tire support 2 may be manufactured of any of a variety of resilient flexible materials such as plastic or rubber. However, other materials may be suitable without departing from the spirit of the present invention. Additionally, top surface 16 may be manufactured of a softer material than the remaining portions of tire support 2 so as to more flexibly support tread area 10 of tire 6 supported thereon.

Figure 2:
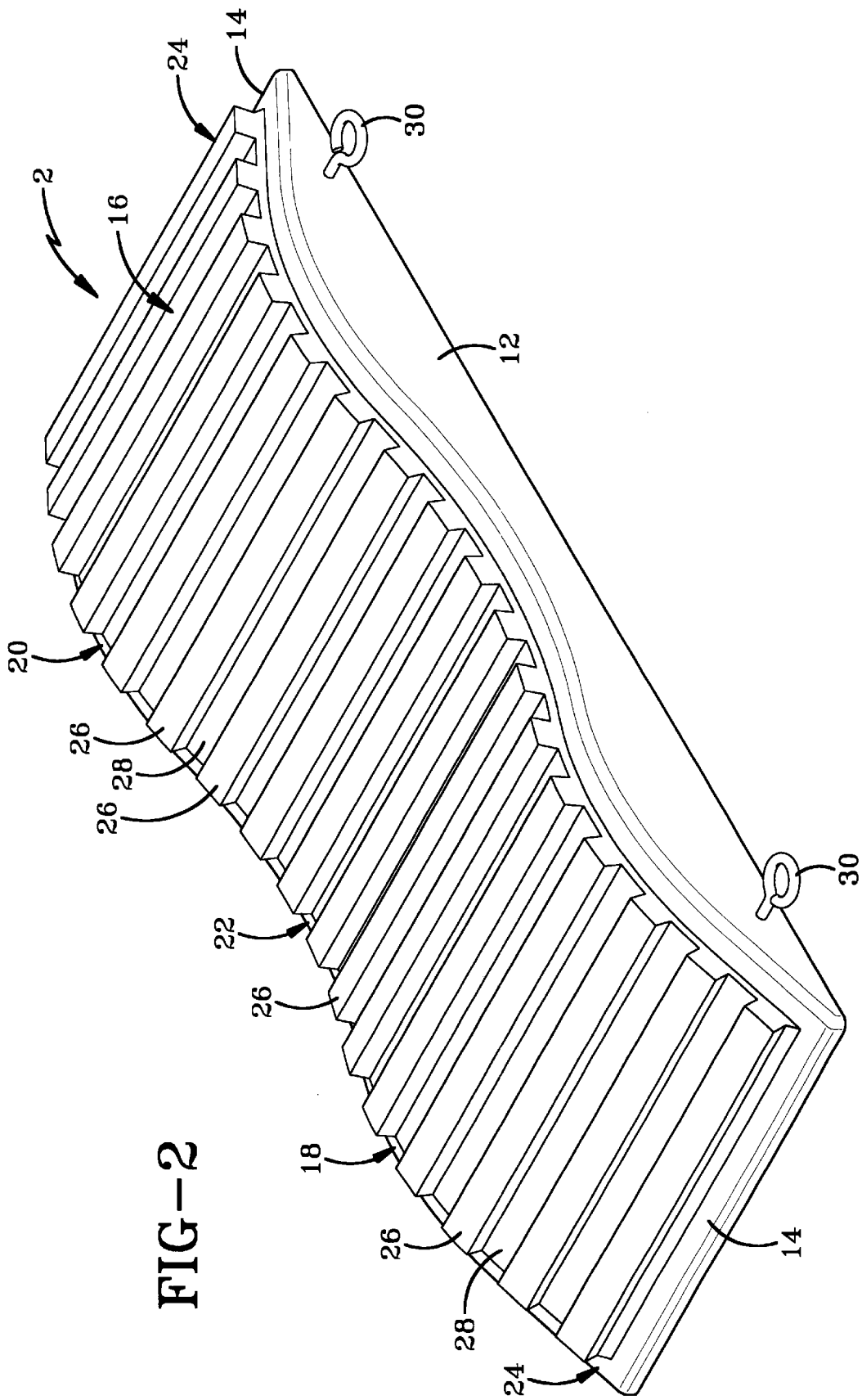
FIG. 2 is a perspective view of the tire support of the present invention.

Top surface 16 preferably has a sinusoidal configuration having a forward peak 18 and a rearward peak 20 spaced apart by a central trough 22. Additionally, ends 14 preferably terminate at or near end troughs 24 so as to assure that the ends are positioned adjacent the ground. As can also be seen from FIG. 2, is sidewalls 12 are complementary shaped to top surface 16 in that they also present a sinusoidal configuration to complementary match top surface 16. Top surface 16 also includes a plurality of parallel and spaced apart bars 26 extending along the entire length thereof which bars are substantially perpendicular to the longitudinal axis of tire support 2. Positioned between successive bars 26 is a similarly shaped recess 28, the purpose for which will be described in more detail below. Lastly, a pair of eye hooks 30 extend outwardly from sidewalls 12 with one eye hook 30 positioned adjacent each end 14.

Referring to FIG. 4, and in accordance with one of the features of the present invention, a plurality of mounting cavities 32 are provided in the bottom surface 34 of tire support 2.

Figure 5:
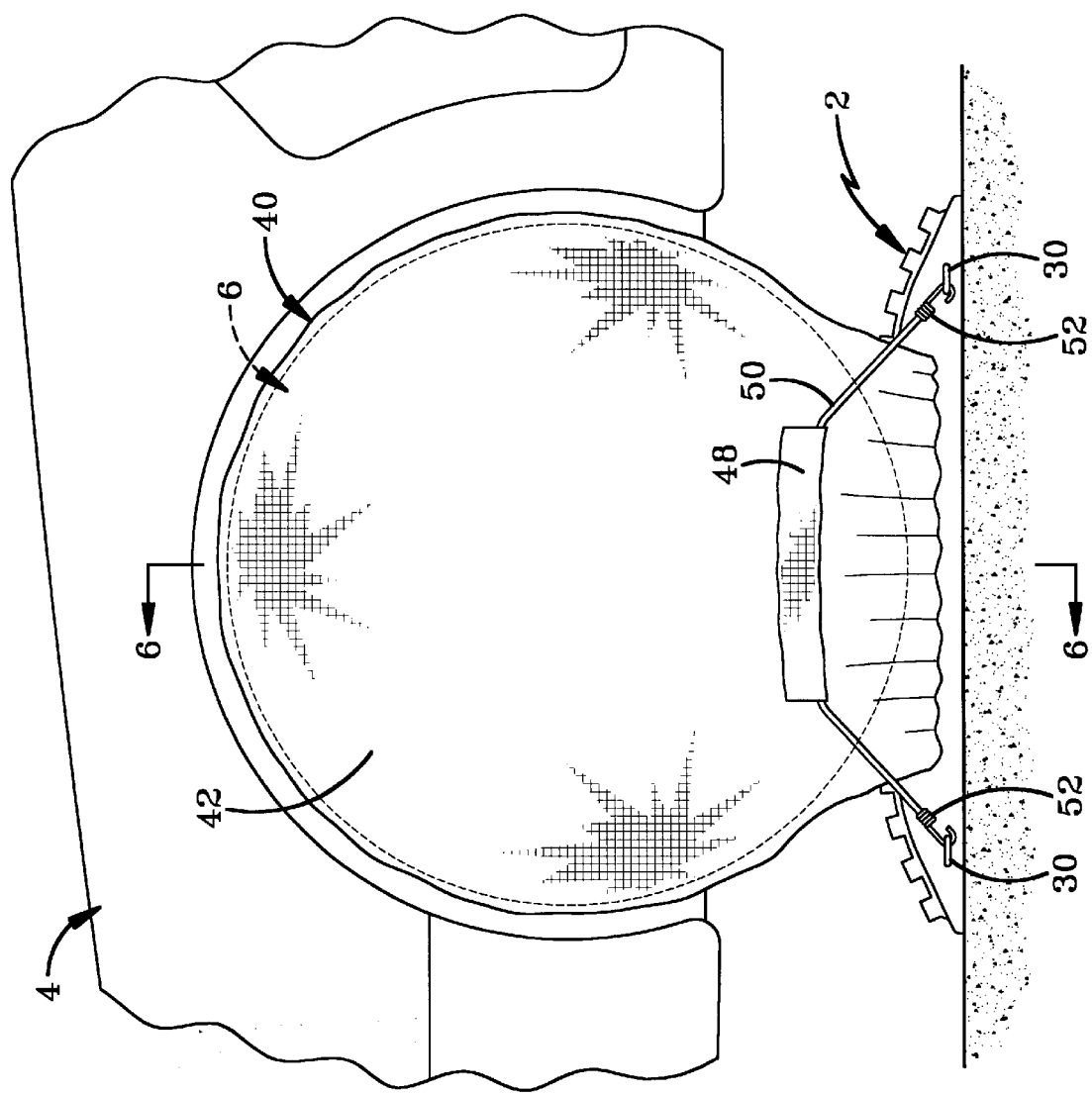
FIG. 5 is a side elevational view of the tire support of the present invention shown supporting a tire and releasably connected to a tire support cover.
Figure 6:
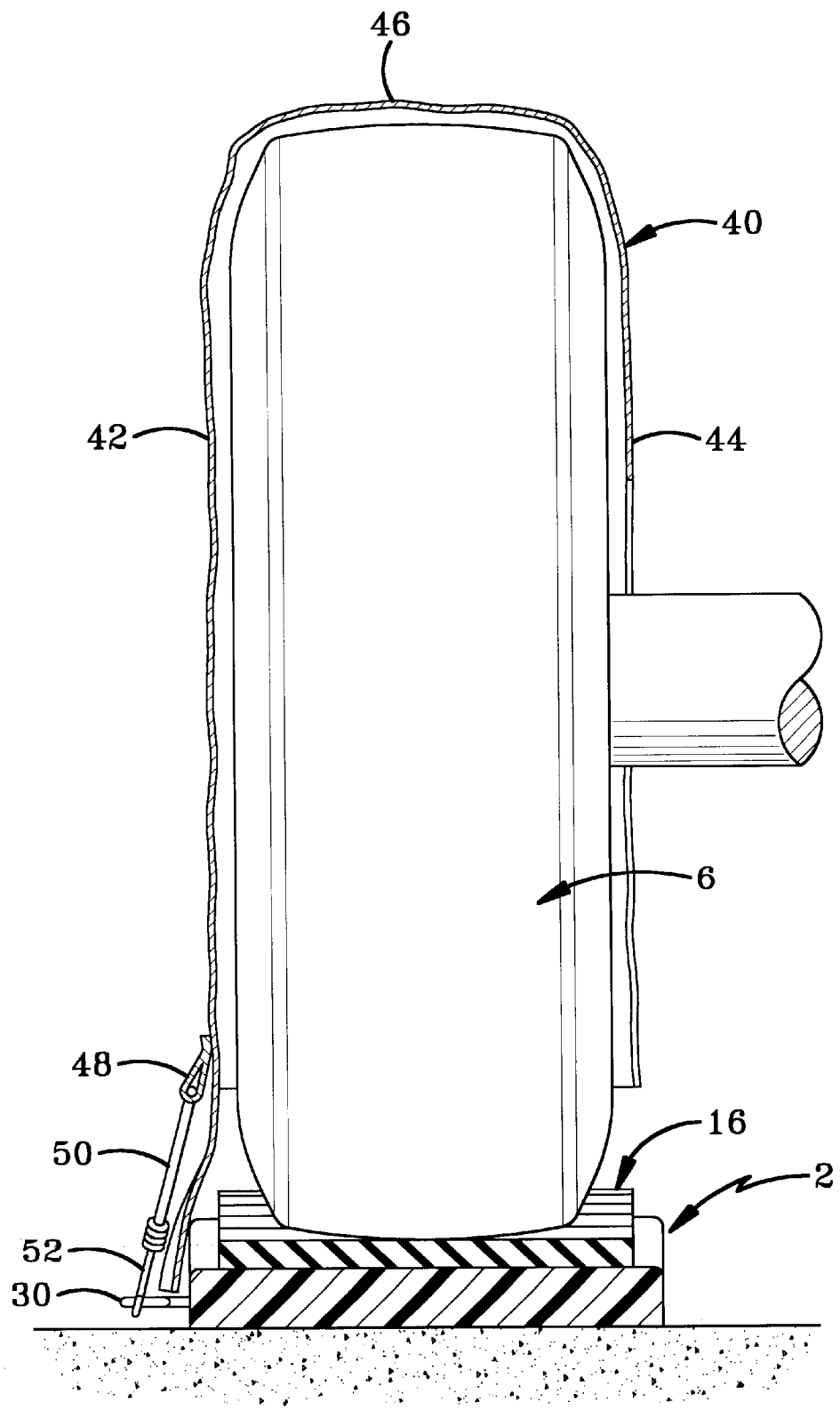
FIG. 6 is a front elevational view of the tire support shown in FIG. 5.

Referring next to FIGS. 5 and 6, tire 6 is shown supported on a tire support 2 with tire 6 partially surrounded by a tire cover 40. Tire cover 40 includes substantially round side surface 42, a partial rear surface 44 and a circumferential wall 46 extending between rear wall 44 and sidewall 42 adjacent tread area 10. Tire cover 40 may be positioned over the tire when positioned on tire support 2 to cover the tire and prevent damage to the tire from UV radiation as a result of the tires day-to-day contact with direct sunlight. While tire cover 40 may be held in position by a variety of configurations, in the preferred embodiment, a sewn loop 48 is positioned on the lower surface of front wall 42 of tire cover 40 and an elastic cord 50 may be positioned within loop 48. Elastic cord 50 is fitted with a pair of hooks 52 which may be removably received within eye hooks 30 carried by sidewall 8 of tire support 2 to provide constant downward force on tire cover 40 and prevent tire cover 40 from being removed from tire 6 as a result of wind and rain. While elastic cord 50 and loop 48 is disclosed in the preferred embodiment, a variety of attachment devices may be utilized to attach tire cover 40 to tire support 2 including hook and loop type fasteners, and spring loaded hooks attached directly into recesses formed within tire support 2.

Referring to FIGS. 7–11, tire support 2 is shown in interlocking engagement with a pair of support blocks 56 and 58. Support blocks 56 and 58 include a pair of parallel and spaced apart sidewalls 60 and angled end walls 62. End walls 62 of support block 56 are positioned to align with end walls 14 of tire support 2 so that a smooth transition from support block 56 to support block 2 occurs at edge 64. Similarly, support block 58 is longer than support block 56 and includes end walls which align in the same plane as end walls 62 of support block 56 along edge 66 to assure a smooth transition from support block 58 to support block 56 and provide a ramp-like structure from the ground to top surface 16 of tire support 2. As can also be seen from the present invention, additional support blocks may be positioned beneath support block 58 to further increase the height of tire support 2 with each additional support block being longer than the previous support block to ensure that a smooth planar transition extends between the ground and tire support 2. In order to assure that tire support 2 is safely attached to support block 56, support block 56 is formed with a plurality of mounting bosses 68 positioned to be received within mounting cavity 32 formed on the bottom surface 34 of tire support 2. Mounting bosses 68 are conical in shape to be more easily received within mounting cavities 32. Mounting bosses 68 assure that a rigid interconnection exists between support block 56 and tire support 2 and prevents both lateral and longitudinal movement of tire support 2 relative to support block 56. Additionally, support block 56 is also formed with a plurality of mounting cavities 32 in the bottom surface thereof. Mounting cavities 32 formed on support block 56 are sized to receive mounting bosses 68 formed on the top surface of support block 58 to also prevent both lateral and longitudinal movement of support block 58 relative to support block 56. In this manner, a relatively large number of mounting blocks may be positioned beneath tire support 2 to provide a secure mounting base thereon.

Additionally, the end walls 62 along with end walls 14 of tire support 2 combine to form a ramp area 70 adjacent each end of tire support 2.

Figure 11:
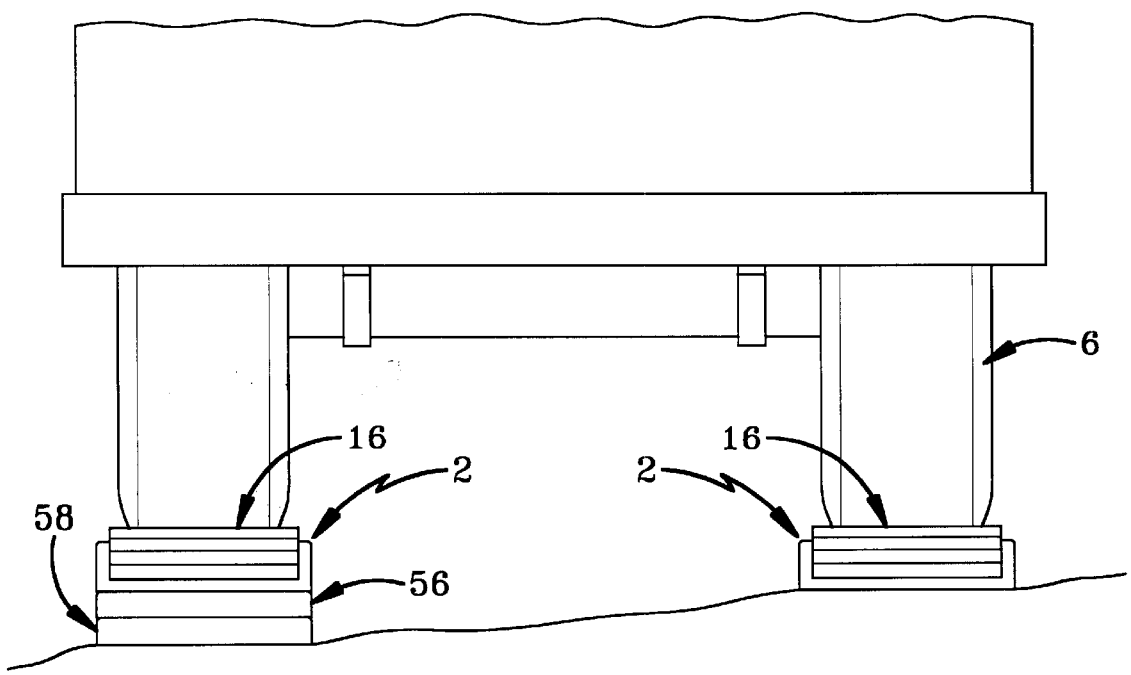
FIG. 11 is a rear elevational view of the tire support and tire support rods as shown in FIG. 7 supporting a vehicle on uneven terrain.
Figure 12:
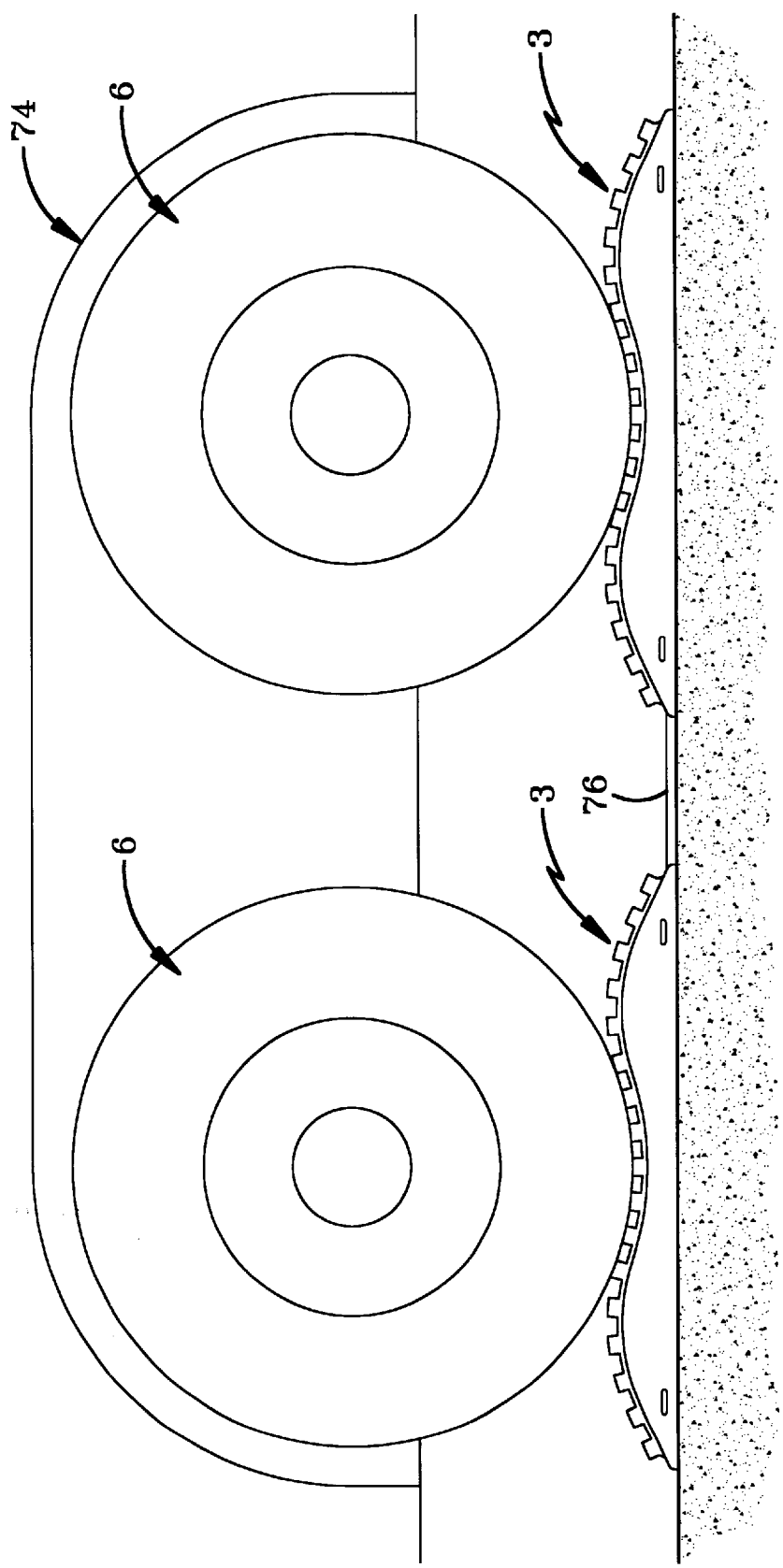
FIG. 12 is a side elevational view of a pair of tire supports of a second embodiment of the invention attached to one another and supporting a tandem axle trailer.

Referring to FIG. 11, a rear view of a vehicle with two tire supports 2 is shown. Tire support 2 on the right is positioned beneath a tire 6 and tire support on the left is also positioned beneath the tire 6. However, the terrain underneath the vehicle shown in FIG. 11 is uneven and two support blocks 56 and 58 have been positioned beneath the tire support 2 on the left side of the vehicle to bring tires 6 approximately level with one another. As can be seen, a variety of interconnections between support blocks 56 and 58 and tire supports 2 are possible without departing from the spirit of the present invention.

Figure 7:
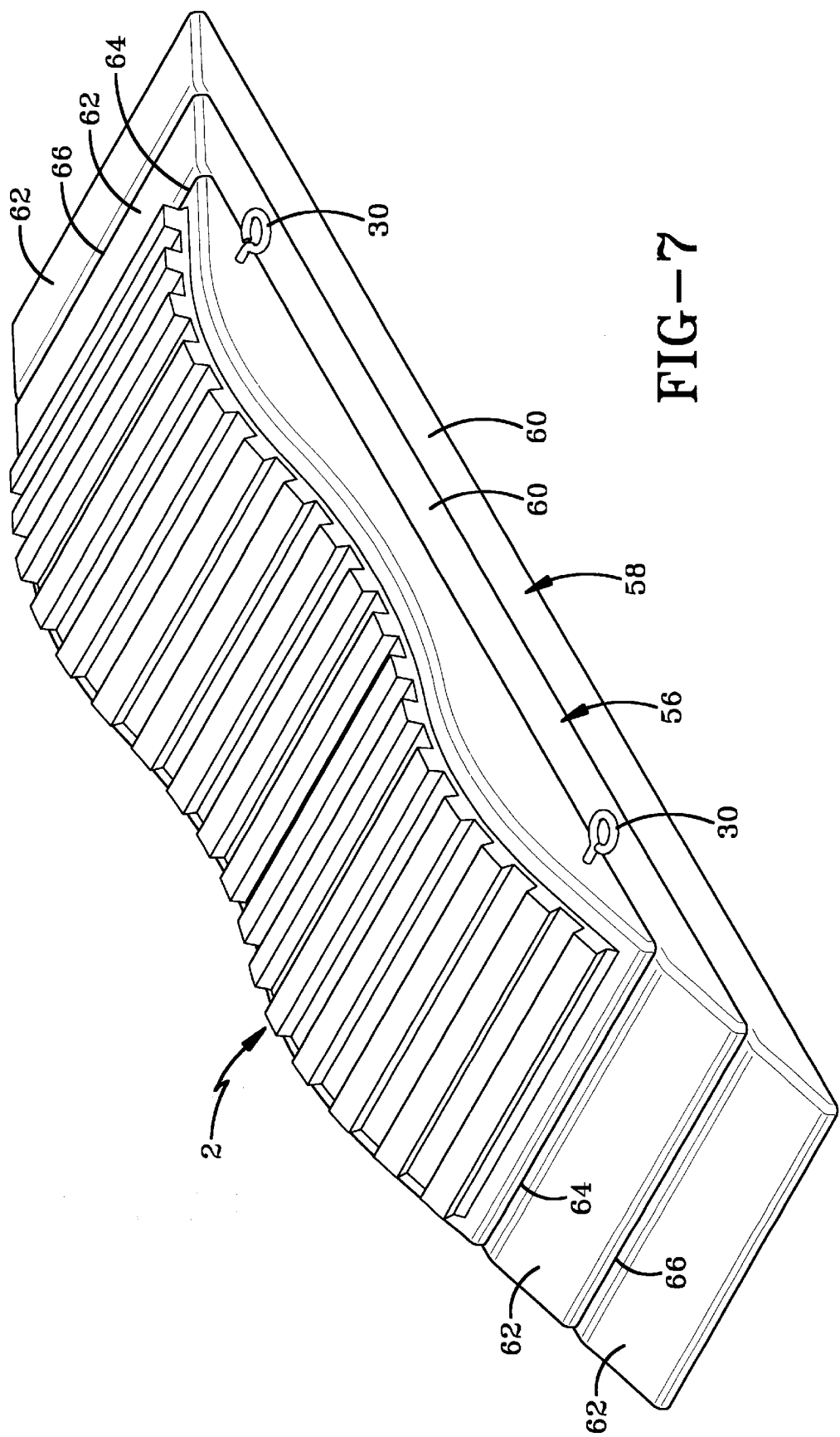
FIG. 7 is a perspective view of the tire support shown in FIG. 2 with a pair of risers positioned below the tire support.
Figure 10:
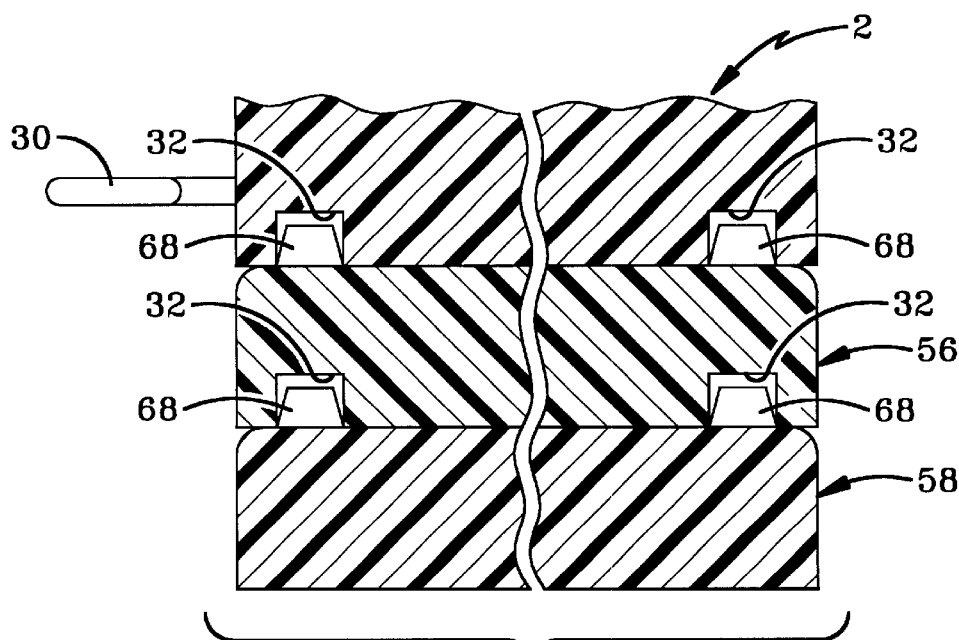
FIG. 10 is a cut-away sectional view taken along lines 10—10, FIG. 8.

As can also be seen from a reference to FIGS. 7 and 11, ramp area 70 provide a smooth transition from support block 56 and 58 to tire support 2 to assure that as vehicle 4 is driven onto tire supports 2, there is no chance of tire support 2 moving out from underneath vehicle 4 as a result of its placement on support block 56 and 58.

Figure 13:
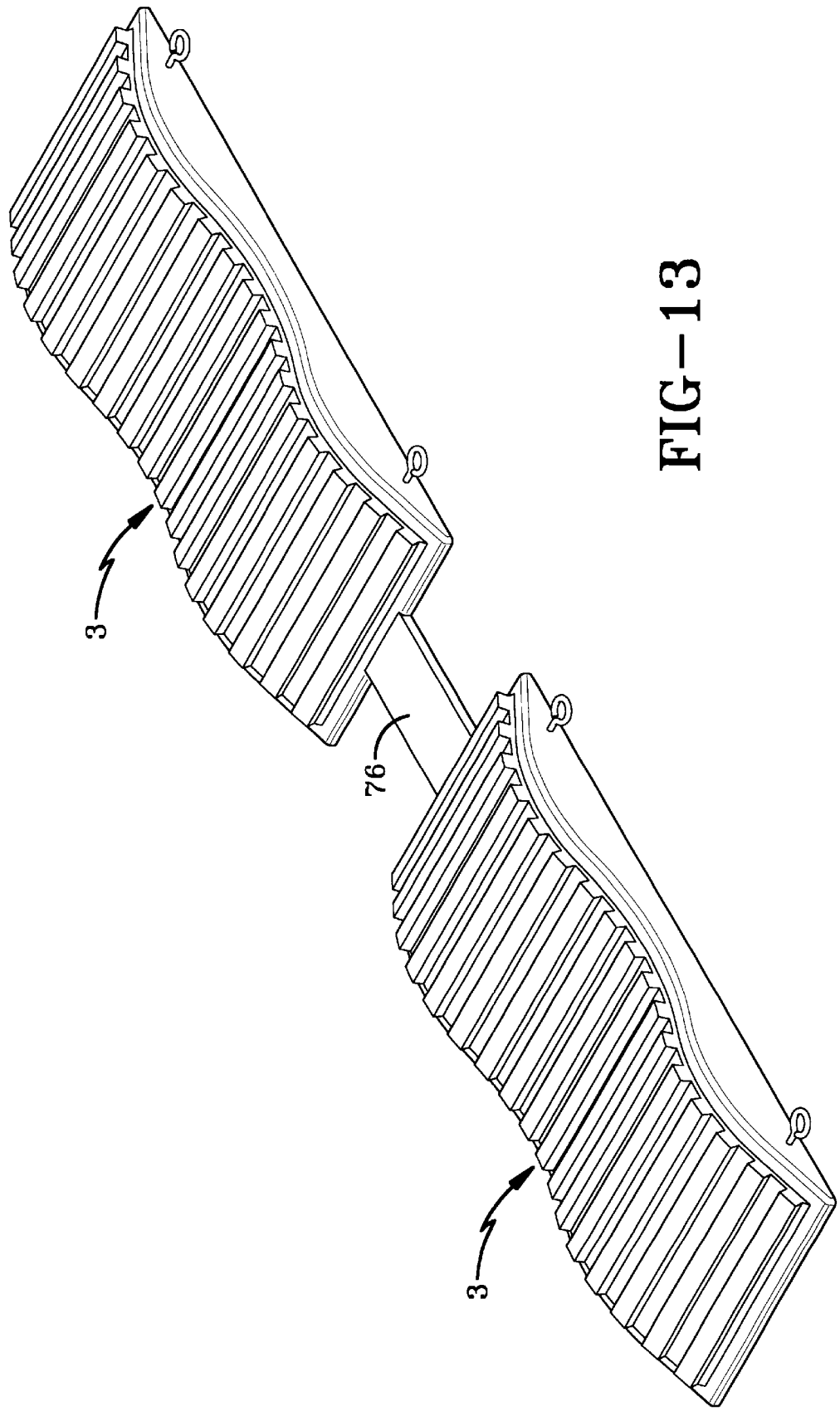
FIG. 13 is a perspective view of the pair of tire supports shown in FIG. 12.
Figure 14:
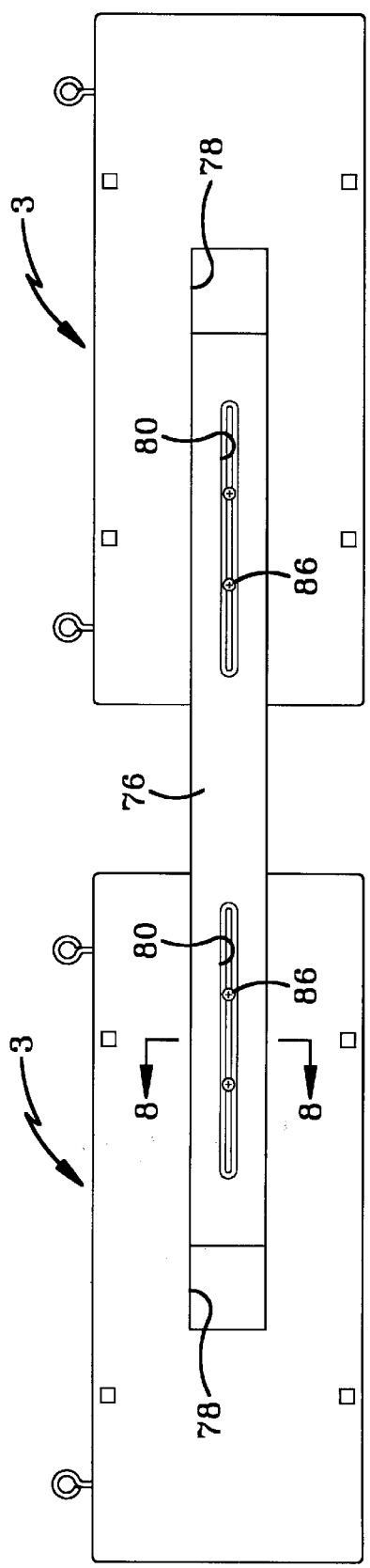
FIG. 14 is a bottom plan view of the pair of tire supports shown in FIG. 13.
Figure 15:
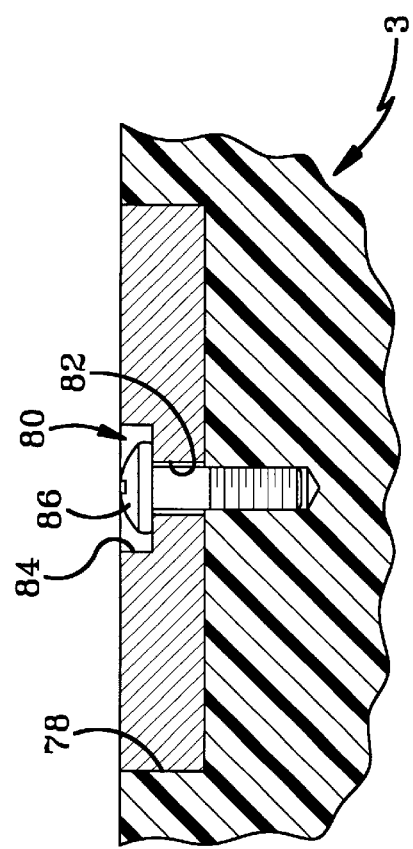
FIG. 15 is a cut-away sectional view taken along lines 15—15 of FIG. 14.

A second embodiment of the invention indicated generally at 3 is shown positioned beneath each tire 6 of a trailer vehicle 74. Tire support 3 is similar to tire support 2 in every way except, in accordance with one of the main features of the present invention, it accepts a connection rod 76. In accordance with one of the features of the present invention, connection rod 76 may be received within a recess formed on the bottom of each of tire supports 3 shown in FIG. 13. More particularly referring to FIG. 14, connector rod 76 is received within a recess 78 formed in the bottom of each tire support 3. Recesses 78 are sized to receive connection rod 76 in a sliding engagement. Connection rod 76 is provided with a pair of elongated slots 80 with each slot 80 having a slot portion 82 and a shoulder portion 84. Slots 80 are sized to receive a pair of threaded fasteners 86 such that connection rods 76 may be adjustably mounted within recesses 78 to vary the distance between tire supports 3. Connection rods 76 may thus be adjustably mounted on tire supports 3 to assure that tire supports 3 are accurately positioned between spaced apart wheels 6 on a given trailer vehicle 74. As such, adjustment of connection rod 76 provides for variations in the distance between wheel 6 on trailer vehicle 74. Operationally, threaded fasteners 86 are loosened, and tire supports 3 are adjusted relative to connection rod 76 to provide for accurate placement of wheel 6 on each of tire supports 3. Once tire supports 3 have been accurately located, threaded fastener 86 may be tightened and a trailer may be driven over tire supports 3 to retain the tire between forward peaks 18 and 20 and within central trough 22 of each tire support 3.

As can be seen from reference to FIGS. 1–15, and more particularly referring to FIG. 1, when a vehicle 2 is driven over tire supports 2 or 3, the tire first contacts end trough 42 and is allowed to pass over rearward peak 20 and into central trough 22. In this manner, tire 6 is positioned between forward peak 18 and rearward peak and within central trough 22 to prevent movement thereof. As can also be seen from a review of FIGS. 1–4, bars 26 of tire support 2 support the tire in an arcuate manner so that an increased surface area of tire 6 is supported on bars 26 around the arcuate perimeter of tire 6 so as to reduce the likelihood that the tire will flatten over time as a result of the continual weight of vehicle 4 being positioned on tire 6. The possibility that the tire will flatten is also reduced by the fact that bars 26 may be made of a more flexible material to assist in spreading the load so that more bars 26 contact the tire around its perimeter to prevent damage to tire 6. Still further, recesses 28 positioned between bars 26 provide air flow around the tire to prevent moisture from being wicked into the tire and rotting the tire. As can also be seen from a review of FIG. 1, tire support 2 is convenient to remove vehicle 4 from tire support 2 as the user may simply drive off of either end trough 24 and through ramp area 70 to allow vehicle 4 to be placed on and removed from tire supports 2 and 3 with a minimum of effort. Still further, tire cover 40 may be easily attached and removed from tire supports 2 and 3 in such a manner so as to minimize the effort necessary to protect tires 6 when vehicle 4 is positioned on tire supports 2 or 3.

Accordingly, the improved tire support is simplified, provides an effective, safe, inexpensive, and efficient device that achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved device for protecting and supporting vehicle tires is construed and used, the characteristics of the construction, and the advantageous, new and useful results obtained; the new and useful structures, devices, elements, arrangements, parts and combinations, are set forth in the appended claims.

what is claimed is:

1. A device for supporting a vehicle tire having a perimeter comprising:

a body having a front ramp surface adapted to permit the vehicle tire to roll thereover;

a top surface for supporting the tire; the top surface having an arcuate configuration adapted for supporting the tire;

the top surface including a first peak, a second peak, and a trough positioned between the first and second peaks;

the first peak, the second peak, and the trough forming a sinusoidal configuration;

the body having a top edge and a bottom edge and including a pair of sidewalls;

each sidewall having a top edge and a bottom edge adapted to engage the ground, and in which the top edges of the sidewalls are sinusoidal; the sidewalls extending between the top edge of the body and the bottom edge of the body to be adapted to provide strength to the body.

2. The device as defined in claim 1, which the trough is formed with a plurality of spaced protrusions extending out of the top surface whereby the protrusions are adapted to support the tire.

3. The device as defined in claim 2, in which each consecutive pair of protrusions defines a groove, and in which the protrusions are adapted to permit airflow around the tire.

4. The device as defined in claim 3, in which the body has a longitudinal direction, and in which the protrusions extend transverse to the longitudinal direction of the body.

5. The device as defined in claim 4, in which the protrusions are substantially square in cross sectional configuration.

6. The device as defined in claim 1, in which the body includes a first portion and a second portion; the first portion of the body including at least a portion of the trough; and the first portion being manufactured of a material having a different hardness than the hardness of the material that forms the second portion of the body.

7. The device as defined in claim 6, in which the material forming the first portion is softer then the material forming the second portion.

8. The device as defined in claim 1 further comprising at least one mount carried by the body, and a cover adapted for extending over at least a portion of the tire, and in which said cover is removably attached to the mount.

9. The device as defined in claim 8, in which the mount includes at least one eyehook extending outwardly from the body, in which the cover is removably attached to the eyehook.

10. The device as defined in claim 1, further comprising at least a first support block removably mounted to the body for raising the height of the top surface.

11. The device as defined in claim 10, in which an attachment device is carried by at least one of the first support block and the body for attaching the first support block to the body.

12. The device as defined in claim 11, in which the attachment device includes a peg extending from one of the first support block and the body, and a cavity sized for receiving the peg formed in the other of the first support block and body.

13. The device as defined in claim 11, in which the first support block includes a front ramp surface; and the body includes a front ramp surface; and in which the front ramp surface of the first support block aligns with the front ramp surface of the body, whereby the front ramp surfaces of the first support block and the body are adapted to provide a surface for the tire to travel over.

14. The device as defined in claim 13, further comprising a second support block positioned below the first support block.

* * * * *